United States Patent
Ramsey et al.

(10) Patent No.: US 7,826,663 B2
(45) Date of Patent: Nov. 2, 2010

(54) REAL TIME ANALYTICS USING HYBRID HISTOGRAMS

(75) Inventors: Mark S. Ramsey, Kihei, HI (US); David A. Selby, Hampshire (GB); Stephen J. Todd, Hants (GB)

(73) Assignee: International Business Machines Corporation, Armonk, NY (US)

( * ) Notice: Subject to any disclaimer, the term of this patent is extended or adjusted under 35 U.S.C. 154(b) by 994 days.

(21) Appl. No.: 11/609,457

(22) Filed: Dec. 12, 2006

(65) Prior Publication Data
US 2008/0140347 A1   Jun. 12, 2008

(51) Int. Cl.
G06K 9/00 (2006.01)
G06F 17/00 (2006.01)
(52) U.S. Cl. .................................. 382/168; 706/53
(58) Field of Classification Search ................ 382/168, 382/207, 228, 274; 358/522; 348/244; 702/180; 706/53
See application file for complete search history.

(56) References Cited

U.S. PATENT DOCUMENTS 7,617,172 B2 * 11/2009 Ramsey et al. ................ 706/53
2005/0083419 A1 * 4/2005 Honda et al. ................ 358/529
2007/0031059 A1 * 2/2007 Achong et al. .............. 382/274

* cited by examiner

*Primary Examiner*—Duy M Dang
(74) *Attorney, Agent, or Firm*—Anna Linne; Hoffman Warnick LLC

(57) ABSTRACT

A system, method and program product for processing a stream of data events using hybrid histograms. A system is provided that includes: a hybrid histogram that provides a running statistical summary of the stream of data events, wherein the hybrid histogram includes a plurality of percentile ranges, a set of boundary values that separate the percentile ranges, and a count associated with each of the percentile ranges; a histogram processing system for identifying a percentile range from the plurality of percentile ranges into which a new data event value falls, and for incrementing the count associated with the identified percentile range; a periodic boundary recalculation system for periodically recalculating the boundary values such that each percentile range includes a substantially similar number of associated counts; and an analysis system that analyzes the hybrid histogram.

26 Claims, 4 Drawing Sheets

HYBRID HISTOGRAM 16
(After Period 1)

50

B1      B2      B3
0-25%  26-50%  51-75%  76-100%

Boundary Values
B1 = $50
B2 = $100   ← 54
B3 = $150

Total # of Events = 100

| Range | Percentile | Counts |
|---|---|---|
| Range 1 | 0-25% | 6 |
| Range 2 | 26-50% | 8 |
| Range 3 | 51-75% | 11 |
| Range 4 | 76-100% | 75 |

52

HYBRID HISTOGRAM 16
(After First Boundary Recalculation)

50

B1      B2      B3
0-25%  26-50%  51-75%  76-100%

Boundary Values
B1 = $95
B2 = $242   ← 54
B3 = $419

Total # of Events = 100

| Range | Percentile | Counts |
|---|---|---|
| Range 1 | 0-25% | 25 |
| Range 2 | 26-50% | 25 |
| Range 3 | 51-75% | 25 |
| Range 4 | 76-100% | 25 |

52

| NN | N | C | | | | K3 | | | B | | |
|---|---|---|---|---|---|---|---|---|---|---|---|
| | | | | | | | | | 0.250 | 0.500 | 0.750 |
| 26 | 26 | 22 | 4 | 0 | 0 | 0.500 | 0.500 | 0.500 | -0.048 | 0.250 | 0.625 |
| 69 | 43 | 26 | 5 | 12 | 0 | 0.596 | 0.673 | 0.750 | -0.260 | 0.101 | 0.438 |
| 171 | 102 | 37 | 15 | 41 | 9 | 0.722 | 0.697 | 0.672 | -0.341 | 0.094 | 0.329 |
| 338 | 167 | 57 | 23 | 37 | 50 | 0.871 | 0.670 | 0.469 | -0.420 | 0.108 | 0.352 |
| 521 | 183 | 61 | 53 | 33 | 36 | 1.058 | 0.772 | 0.487 | -0.509 | 0.014 | 0.326 |
| 668 | 147 | 46 | 15 | 34 | 52 | 1.044 | 0.834 | 0.625 | -0.574 | 0.085 | 0.391 |
| 766 | 98 | 40 | 16 | 20 | 22 | 1.317 | 0.965 | 0.613 | -0.783 | 0.016 | 0.375 |
| 977 | 211 | 68 | 48 | 62 | 33 | 1.596 | 1.158 | 0.719 | -0.898 | -0.042 | 0.308 |
| 1308 | 331 | 98 | 61 | 86 | 86 | 1.712 | 1.206 | 0.700 | -0.977 | -0.018 | 0.315 |
| 1595 | 287 | 63 | 60 | 77 | 87 | 1.917 | 1.292 | 0.666 | -0.918 | 0.074 | 0.350 |
| 1917 | 322 | 88 | 96 | 65 | 73 | 1.985 | 1.268 | 0.552 | -0.965 | -0.017 | 0.337 |
| | | | | | | | | ok B= | -1.000 | 0.000 | 0.333 |

FIG. 3

REAL TIME ANALYTICS USING HYBRID HISTOGRAMS

FIELD OF THE INVENTION

The invention relates generally to analyzing event data, and more particularly to a system and method that utilizes a hybrid histogram for real time data analysis.

BACKGROUND OF THE INVENTION

There exist numerous applications in which real time data analysis may be required. For example, data events may be collected in a financial setting to identify potentially fraudulent activity, in a network setting to track network usage, in a business setting to identify business opportunities or problems, etc. Often, it may be necessary to examine individual data events as they occur to immediately investigate any suspect behavior. Challenges however arise when analyzing data events in real time since historical data values are typically necessary to identify trends and patterns. Namely, accessing and processing historical data can be a relatively slow process, and thus limits real time processing.

Because real time analysis techniques do not have the luxury of examining significant amounts of historical data, one approach is to use running values, in which a new statistical summary (e.g., median, mean, standard deviation, etc.) is calculated based on a previously calculated statistical summary each time a new data event occurs. Such techniques only require storage and retrieval of the previously calculated statistical summary, so real time performance is readily achievable. Unfortunately, there are many applications in which such simple statistical summaries are insufficient for providing an adequate statistical assessment of the data.

An approach commonly used for analyzing data involves the use of a histogram, which allows data frequencies to be viewed over a set of ranges. Unfortunately, real time processing is challenging when histograms are utilized to analyze data. With histograms, rather than just storing and generating a few pieces of data (e.g., median, mean, standard deviation, etc.), a large number (e.g. 256) of data values must be maintained. This can be particularly challenging where it is necessary to keep a running profile (i.e., histogram) of many different data event streams. Histograms are thus not always suitable for real time use primarily because (1) they are expensive to maintain in real time; and (2) they are memory intensive for the amount of real information held.

One of the key computational challenges with using histograms involves setting the boundaries. For example, in an application that tracks credit card usage for a customer, histogram ranges of $1-$20, $21-40, $41-60, $61-80, $81-100 and above $100 may make sense for many customers. However, there may be customers who primarily make purchases over $100. In such a case, the defined boundaries would provide little useful information. Having different boundaries for different customers would require additional storage and computational requirements, and is therefore not a good solution in a real time analysis environment.

A further option would be to utilize percentiles, wherein new data values are placed into data percentile ranges. Thus, e.g., the lowest 20% credit card charges are placed in a first range, the next 20% are placed into a second range, etc. Using such a technique, data values can be more effectively spread over a set of percentile ranges. However, because each percentile range includes approximately the same number of data values, the actual values associated with the range boundaries must be known in order to place data into the right percentile range and these values potentially change every time new data values are collected. For example, the lowest 20% of a customer's credit card charges may include 25 charges below $30, and the next 20% may include 24 charges above $30 and below $40. When a new charge of $15 occurs, a new boundary may need to be recalculated between the first 20% and the second 20%. For example, the first percentile range may now include 25 charges below $28, and the second percentile range may now include 25 charges ranging from $28 to $40. The process of recalculating boundaries every time a new value is entered likewise significantly limits the ability to use such a technique in a real time environment.

Accordingly, a need exists for a real time technique that would allow for the use of a histogram type data analysis.

SUMMARY OF THE INVENTION

The present invention addresses the above-mentioned problems, as well as others, by providing a system, method and program product for processing a stream of data events using a hybrid histogram. The technique comprises holding a structure with information similar to that of a histogram, but with varying boundaries between percentile ranges. The percentile ranges are then periodically (i.e., from time to time when deemed appropriate) recalculated so there is greater entropy of useful information for the amount of data held and be more suitable for high performance applications.

In a first aspect, the invention provides a system for processing a stream of data events, comprising: a hybrid histogram that provides a running statistical summary of the stream of data events, wherein the hybrid histogram includes a plurality of percentile ranges, a set of boundary values that separate the percentile ranges, and a count associated with each of the percentile ranges; a histogram processing system for identifying a percentile range from the plurality of percentile ranges into which a new data event value falls, and for incrementing the count associated with the identified percentile range; a boundary recalculation system for periodically recalculating the boundary values such that each percentile range includes a substantially similar number of associated counts; and an analysis system that analyzes the hybrid histogram.

In a second aspect, the invention provides a computer program product stored on a computer readable medium, which when executed, processes a stream of data events, the program product comprising: computer program code configured for updating a hybrid histogram data object that stores a running statistical summary of the stream of data events, wherein the hybrid histogram data object includes a plurality of percentile ranges, a set of boundary values that separate the percentile ranges, and a count associated with each of the percentile ranges; computer program code configured for identifying a percentile range from the plurality of percentile ranges into which a new data event value falls, and for incrementing the count associated with the identified percentile range; computer program code configured for periodically recalculating the boundary values such that each percentile range includes a substantially similar number of associated counts; and computer program code configured for analyzing the hybrid histogram data object.

In a third aspect, the invention provides a method of processing a stream of data events, comprising: providing a hybrid histogram that stores a running statistical summary of the stream of data events, wherein the hybrid histogram includes a plurality of percentile ranges, a set of boundary values that separate the percentile ranges, and a count associated with each of the percentile ranges; obtaining a new data event value; identifying a percentile range from the plurality of percentile ranges into which the new data event value falls; incrementing the count associated with the identified percentile range; periodically recalculating the boundary values such that each percentile range includes a substantially similar number of associated counts; and analyzing the hybrid histogram.

In a fourth aspect, the invention provides a method for deploying a system for processing a stream of data events, comprising: providing a computer infrastructure being operable to: access a hybrid histogram that stores a running statistical summary of the stream of data events, wherein the hybrid histogram includes a plurality of percentile ranges, a set of boundary values that separate the percentile ranges, and a count associated with each of the percentile ranges; obtaining a new data event value; identify a percentile range from the plurality of percentile ranges into which the new data event value falls; increment the count associated with the identified percentile range; periodically recalculate the boundary values such that each percentile range includes a substantially similar number of associated counts; and analyze the hybrid histogram.

BRIEF DESCRIPTION OF THE DRAWINGS

These and other features of this invention will be more readily understood from the following detailed description of the various aspects of the invention taken in conjunction with the accompanying drawings in which:

FIG. 3 depicts a table showing experimental results of boundary changes in accordance with an embodiment of the present invention.

DETAILED DESCRIPTION OF THE INVENTION

Figure 1:
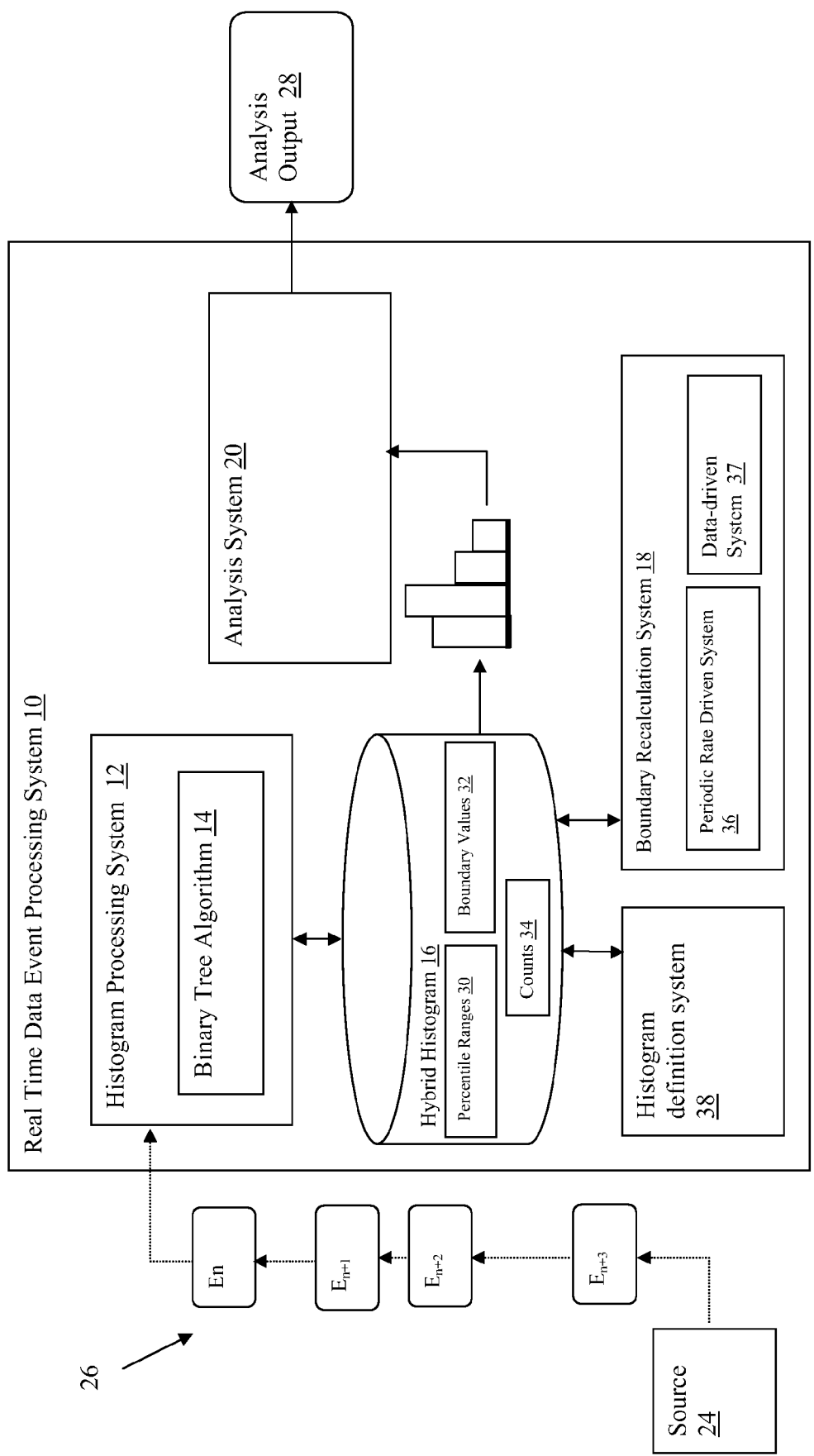
FIG. 1 depicts a real time data event processing system in accordance with an embodiment of the present invention.

Referring now to drawings, FIG. 1 depicts a real time data event processing system 10 that receives and processes a stream of data events ("stream") 26 from a source 24. Source 24 may comprise anything that generates data, e.g., a financial institution, a network, a device, a computer program, a business, an enterprise, etc. Data contained within the stream 26 may comprise any type of information that is created, generated, transmitted and/or received (i.e., "obtained") over time. Stream 26 generally comprise a series of event values ($E_n$, $E_{n+1}$, $E_{n+2}$, etc.) that can correspond to any type of data, e.g., withdrawal amounts, bit usage, etc. Although the embodiment of FIG. 1 is shown processing one stream 26, it is understood that real time data event processing system 10 can be implemented to process any number of streams, i.e., one or more.

Real time data event processing system 10 provides and maintains a real time hybrid histogram 16 for the stream of data events 26. To implement such functionality, real time data event processing system 10 includes a histogram definition system 38 in which parameters for the hybrid histogram 16 are determined. Namely, histogram definition system 38 provides a mechanism, such as a user interface, a set of default values, a heuristic, etc., for defining a number of percentile ranges 30 contained within the hybrid histogram 16 and initial boundary values 32 for the percentile ranges 30. The initial boundary values 32 are essentially initial estimates (but could be any initial values) that will separate the inputted data events into the percentile ranges 30 (e.g., bottom 25%, second 25%, third 25%, and top 25%).

For the purposes of this disclosure, hybrid histogram 16 may comprise any object (e.g., graphical display, table, database, array, data structure, etc.) that tabulates or tracks the count (C) of event values that fall into each of several or many specified percentile ranges or categories. Percentile ranges 30 (PR) have fixed boundary values 32 (B) for some period, at the end of which time the boundary values 32 are recalculated. An illustrative hybrid histogram application is described below in FIGS. 2A-D.

As new data event values arrive, they are processed by histogram processing system 12 to determine which percentile range 30 within the defined hybrid histogram 16 each incoming data event value belongs. Once an appropriate percentile range 30 is identified, histogram processing system 12 increments a count (C) 24 associated with percentile range 30.

In one illustrative embodiment, a binary tree 14 or binary chop algorithm is utilized to determine the appropriate percentile range 30. The use of a binary tree algorithm 14 is particularly straightforward where the number of percentile ranges R is a power of 2, but a slightly unbalanced tree can be used for any value of R. In such a binary tree algorithm 14, the top node of the tree splits at the 50 percentile, so half the percentile ranges are to the right of the node and half are to the left. Every node below splits its inputs in half, i.e., the left node at the second level will split the low 50% into 0-25% and 25-50%; the right node will split the high 50% into 50-75% and 75-100%, etc. At each level, the inputted data event value is compared to the boundary value associated with the percentile. If the data event value is less than the boundary value 32, then logic proceeds down the left side of the node, and if it is greater, logic proceeds down the right side of the node. Thus, the number of computations for identifying the appropriate percentile range to which a data event value belongs is log2(R), where R is the number of percentile ranges 30.

Rather than using a binary tree algorithm 14, it may be feasible to simply run a filter for each boundary value 32 to identify the appropriate percentile range for each new data event value. However, for R percentile ranges 30, this would require up to R tests for each new data event value. For coarse inverse histograms (e.g., 10 percentile ranges or so), it may be practical.

As noted above, one of the issues with a pure histogram is that because the boundary values 32 do not change, a poorly chosen set of boundary values will result in unusable information. Conversely, with a pure inverse histogram (percentile), the boundaries continuously change to ensure that all percentile ranges are maintained equally full. While this approach does not require count information to be kept for each percentile range, it requires that the boundaries be recomputed after each new data event value insertion. Note that even though the new event lies in only one percentile, if affects all percentile boundaries, so all boundaries need to be recomputed.

Instead of the two traditional approaches described above, the present embodiments utilize a hybrid approach in which the boundary values 32 are periodically (i.e., from time to time when deemed appropriate) recalculated by boundary recalculation system 18, as opposed to after insertion. Two approaches are disclosed herein, a periodic rate driven system 36 and a data-driven system 37. In this manner, the percentile ranges 30 are not kept equally full (but are more regularly populated than in a true histogram), until a recalculation takes place. Accordingly, both the number of counts (C) 34 in each percentile range 30 and the boundary values 32 between each percentile range 30 are stored. As new data event values arrive, the appropriate count is updated, but the boundary values 32 are not adjusted. This still requires log2(R) comparisons to locate the correct percentile range, but only a single cumulative count update operation is needed.

Depending how the information is to be used, there may be interest in regular percentile ranges 30 (e.g., for R=4, values for the 25, 50, 75 percentiles) or more skewed percentile ranges giving a more precise picture of a particular part of the distribution (e.g., values for the 50, 75, 90 percentiles). In an illustrative embodiment, the boundary values for the required percentiles ranges are saved in an array PR[ ], and PR[ ] holds fractional values in the range 0 to 1 (e.g., 0.5, 0.75, 0.9), with PR[q] holding the boundary value for the top of the q'th range. Values for PR[0]=0 and PR[R]=1 may be stored if convenient in implementation. Where regularly spaced ranges are used there is no need to save this array PR, and certain calculations discussed below may be appropriately simplified for computational efficiency.

The technique utilized herein only computes percentile range boundary values, e.g., stored in an array B[ ]. Logically, values B[0] for the minimum value yet encountered, and B[R] for the maximum value yet encountered could be saved. The technique intentionally avoids the use of these values for calculation to prevent a single extreme, rendering the method unstable.

Using the periodic rate driven system 36, boundary recalculation system 18 periodically readjusts the percentile range boundary values 32 and resets the counts 34 using a defined periodic rate. The appropriate periodic rate (e.g., n=100) will depend on the application requirements. As often with real time techniques, unless the hybrid histogram is seeded from static data, more frequent adjustments may be required during the early learning periods. Accordingly, the periodic rate need not be a fixed value, but may change over time, and any method may be utilized for selecting the periodic rate.

As an alternative to periodic rate driven system 36 described above, the boundary reevaluation may be triggered by the data distribution itself using data-driven system 37. A simple example of this checks the number of events (C[q]) in a percentile range or "bucket" (q) against its balanced size N*W[q], where N is the total number of stored events, and W[q] is the width PR[q]-PR[q-1] of bucket q. If C significantly exceeds N*W[q] on insertion of an event into bucket q, then the histogram is unbalanced, and a rebalance operation is triggered. This "significant" decision may be made based on either the size exceeding an expected size by a fixed number (RKN) or by a proportion (RKP), or a combination, as follows:

$$C[q] > RKN + RKP*N*W[q] \quad \text{[eqn 1]}$$

This technique has the benefit that it automatically adjusts to the "incorrectness" of the current boundary values. The more errors in the boundary values, the greater the skew of counts, and the fewer total counts N needed to force the boundary reevaluation.

It may be decided to rebalance only parts of the histogram at a certain time. For example, if the left hand half of the histogram is relatively balanced, but the right hand half has become significantly unbalanced, we may choose to rebalance just the right hand half.

Boundary recalculation system 18 may utilize a rebalancing algorithm that operates by comparing the actual number of events counted below a given boundary with the expected value, and adjusting the boundary accordingly. Thus, when looking at a particular boundary, there may be a cumulative count CC of events counted in the buckets below that boundary. As the rebalancing algorithm attempts to make the bucket count distribution match the distribution defined in the percentile ranges PR, the expected number of counts below boundary q of R buckets is N*PR[q], where N is the total number of recorded counts. If CC is above this expected value, this indicates too many events counted below the boundary, which indicates that the boundary is too low and should be adjusted upwards. Conversely, a CC above the expected value indicates that the boundary should be adjusted downwards.

An adjustment equation for the q'th boundary B[q] may be given as $$B[q] = B[q] + K*(N*PR[q] - CC), \quad \text{[eqn 2]}$$

where K is an adjustment rate constant. K is a number used to control the rate of adjustment of a running summary. In a running median or running percentile calculation that reevaluates for each event, the running estimate is either increased or decreased depending whether the value for the new event is above or below the running estimate, the size of the change being dependent on K and the percentile being calculated. The larger the K, the faster the adjustment of the estimate, but the less stable the resulting estimate. Eqn 2 is a derivative of such an equation, modified to allow for a bulk change resulting from a set of new entity values being considered in a single recalculation, with some above and some below the percentile boundary value.

It is desirable that the adjustment rate K be faster the more inaccurate the boundary values. Where data driven rebalancing is implemented as in eqn 1, advantage is taken of the fact that where boundaries are inaccurate, boundaries will be recomputed more often (e.g., N will be small), and adjusted based on the skewness as a ratio rather than the skewness as an absolute count value:

$$B[q] = B[q] + K2*(PR[q] - CC/N) \quad \text{[eqn 3]}$$

where K2 (e.g., 0.5) is an alternative selection for K. K2 may now be kept constant, and where boundaries are inaccurate, the result will be both more frequent boundary reevaluations (from eqn 1) and also more extreme adjustment (from eqn 3).

If some additional information is known a-priori about the general distribution, a change to B[q] may be made with an appropriate variation of eqn 3. For example, the size of the adjustment may also be proportional to the boundary value, using a multiplicative rather than an additive adjustment, so that larger values also adjust proportionately faster.

In general, such accurate a-priori knowledge will not be known, so an automatic method may be used. This method takes advantage of the fact that where data distribution is heavily skewed, the boundary values will be similarly skewed, and thus arranges automatic adaptation of the adjustment rate K2. It expands or contracts K2 according to: (a) the width of adjacent buckets in terms of their value boundaries, and (b) the width in terms of their percentile boundaries. Thus, for boundary q, K3 may be computed according to the bucket on each side of the boundary, e.g., using values from the boundary next below (l=q-1), and the boundary next above (r=q+1).

$$K3[q] = K2*(B[r] - B[l])/(PR[r] - PR[l]) \quad \text{[eqn 4a]}$$

$$B[q] = B[q] + K3[q]*(PR[q] - CC/N) \quad \text{[eqn 4b]}$$

As noted above, the extreme left bucket (q=1) does not have a reliable minimum boundary B[0], and the extreme right bucket (q=R) does not have a reliable maximum boundary B[R]. Therefore, for the first 'real' boundary B[1] we scale only according to the bucket to its right (l=1, r=2), and for the last 'real' boundary B[R−1] we scale according to the bucket to its left (l=R−2, r=R−1).

The K3 values are shown above as an array indexed by bucket q, to emphasize that K3 is automatically adjusted for each bucket q. However, K3 is only used as an intermediate variable in a typical implementation of the method. It does not need to be held as an array, or to be saved between one event and the next.

Where high values of K (and hence K2, K3) are used, the values will become less stable. In extreme cases, this may cause estimate for boundary B[q] to be greater than the estimate for the preceding boundary B[q−1]. Resulting problems can be removed by forcing B[q] to be equal to B[q−1]. They will naturally separate again, in the correct direction, in subsequent recalculations.

FIG. 3 depicts a table showing the output of an experiment using simulated random data skewed by an inverse probability law. A small value R=4 is used for illustrative purposes. NN shows a total number of events, and N the number of events counted before each rebalance. C shows the count in each bucket before each rebalance is forced. K3 shows the automatically adjusted adaptation rate, with the initial numbers giving the total number of events NN, and the number of events N in between each rebalance. B shows the boundary values, initially assumed to be linear. 'ok B' at the bottom shows the correct boundary values for this distribution of data.

Notice that the values B generally move towards the 'ok B' values as more events are recorded, with some oscillating around the correct value once it is reached. Also, notice that early C values are highly skewed due to the incorrect choice of boundaries, and become more regular as time advances and the data-driven system 37 learns the correct boundaries. Because of this initial high skew, the number N of events needed to force rebalance starts small, and increases as stable values are approached. This illustrates the dynamic effect of eqn 1.

Further, despite the small number of events (i.e., 26) before the first rebalance, the actual scale of the rebalance is quite large (e.g., the first boundary changes by over 0.25). The size of later rebalances is smaller despite the larger number of events contributing to the rebalance. The last boundary recalculation shows a first boundary change of 0.05 for 322 events. This illustrates the dynamic effect of eqn 3.

Finally, the values for K3 start fairly low and identical, as we have assumed no a-priori knowledge of either the style or scale of the distribution. By the end the K3 values are larger, but with K3[1]>K3[2]>K3[3]. The general growth reflects the fact that the spread of values B is greater than initially expected. The skew between the different values reflects the skew in the distribution, with a flatter, wider curve at the left and a stepper, narrower curve towards the right. These adaptations of K3 illustrate the dynamic effect of eqn 4.

Analysis system 20 provides mechanisms (e.g., algorithms, programs, heuristics, modeling, etc.) for analyzing data event values based on the hybrid histogram 16, and for generating an analysis output 28. Illustrative types of analysis may include identifying potentially fraudulent activities, identifying trends and patterns, identifying risks, identifying problems, identifying business opportunities, etc. For example, a new data event value that falls into a top percentile range may indicate an unusual bank withdrawal, an unusual amount of bandwidth usage in a network, etc.

In a simple application, analysis system 20 might thus look at where a new data event value falls within the hybrid histogram 16. If the new data event value falls within an extreme percentile range 30, analysis system 20 may issue a warning as the analysis output 28.

FIGS. 2A, 2B, 2C and 2D depict a simple example of a hybrid histogram application. Each of these figures depicts an illustrative hybrid histogram 16 that includes a visual representation 50 on the left hand side and a table 52 on the lower right hand side that shows the actual number of counts per range. Also shown are the current boundary values 54 and total number of events. In this simple example, hybrid histogram 16 includes four percentile ranges (0-25%, 26-50%, 51-75% and 76-100%), and three boundaries (B1, B2 and B3).

Figure 2A:
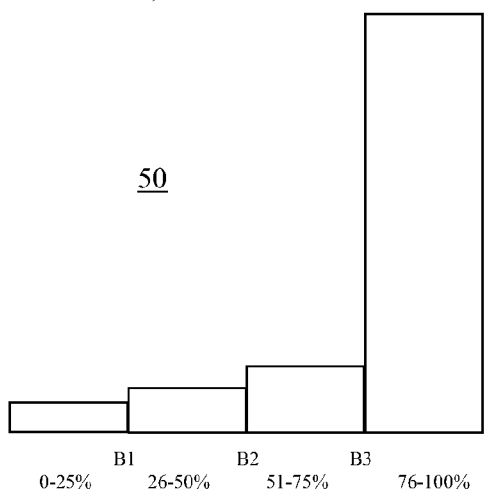
FIGS. 2A, 2B, 2C and 2D depict an example of a hybrid histogram application in accordance with an embodiment of the present invention.
Figure 2B:
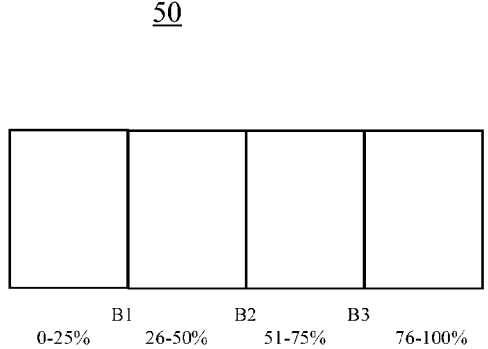

As can be seen in FIG. 2A, initial boundary values 54 of $50, $100 and $150 were selected. After period 1 (i.e., 100 events), it can also be seen that most of the data event values (i.e., counts) are in the top percentile range. FIG. 2B depicts hybrid histogram 16 after a first boundary value recalculation (i.e., after the 100 events). As can be seen, the counts are now equally distributed amongst the percentile ranges, and the boundary values have been changed to $95, $242, and $419.

Figure 2C:
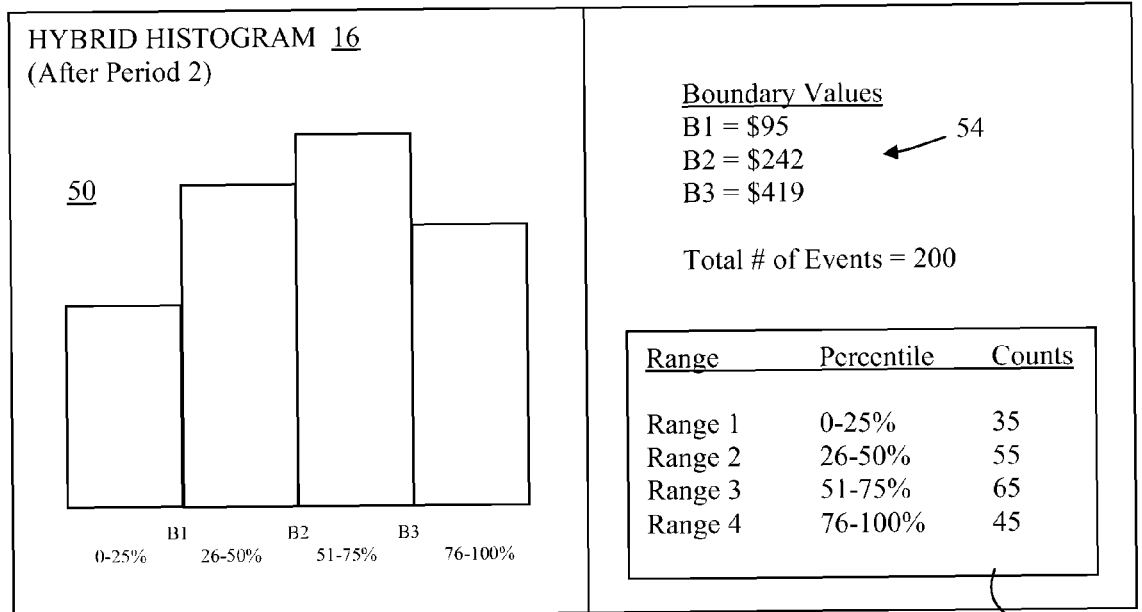
Figure 2D:
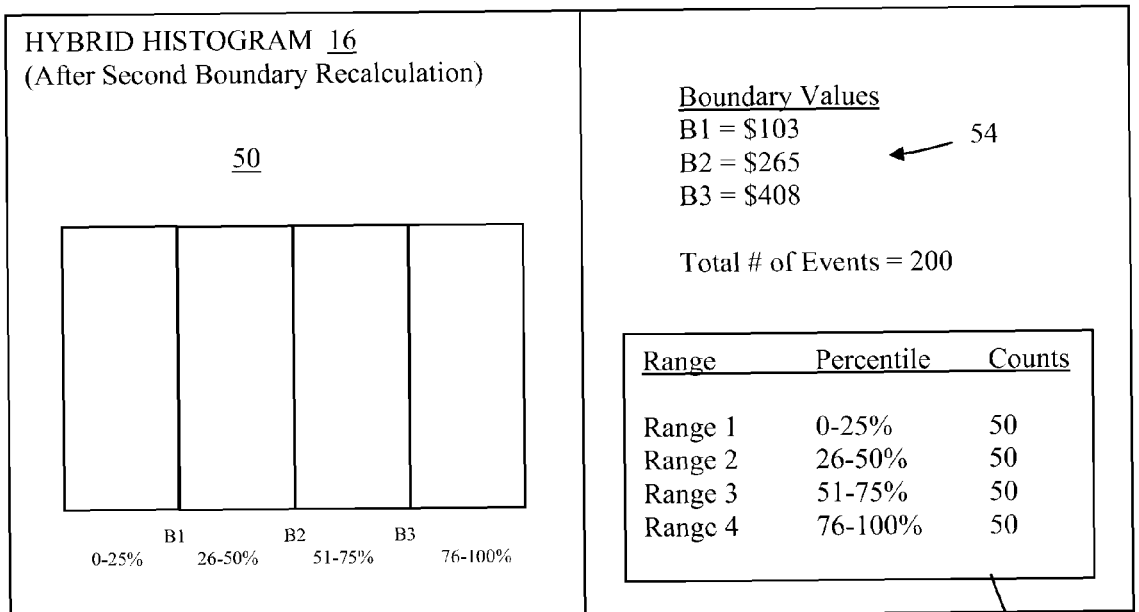

FIG. 2C depicts hybrid histogram 16 after period 2 (i.e., 200 events). As can be seen now, the boundary values remained constant during the period, and the counts were unequally distributed amongst the different percentile ranges. Thus, at the end of period 2, the four percentile ranges have counts of 35, 55, 65, and 45, respectively. FIG. 2D depicts hybrid histogram 16 after a second boundary value recalculation (i.e., after the 200 events). As can be seen the counts are now equally distributed amongst the percentile ranges, and the boundary values have been changed to $103, $265, and $408. Over time, one would expect the boundaries values to stabilize to fairly consistent values. As such, the period between recalculations could be increased to minimize computations.

It will be noted that this technique is lossy, as are almost all summarization techniques, as it remembers in which current percentile range each even happens, but does not remember the exact event value. The exact event values could also be recorded for use by a more complete analysis, but are not needed to be available.

It should be understood that real time data event processing system 10 (FIG. 1) may be implemented using any type of computing device, and may be implemented as part of a client and/or a server. Such a computing system generally includes a processor, input/output (I/O), memory, and a bus. The processor may comprise a single processing unit, or be distributed across one or more processing units in one or more locations, e.g., on a client and server. Memory may comprise any known type of data storage and/or transmission media, including magnetic media, optical media, random access memory (RAM), read-only memory (ROM), a data cache, a data object, etc. Moreover, memory may reside at a single physical location, comprising one or more types of data storage, or be distributed across a plurality of physical systems in various forms.

I/O may comprise any system for exchanging information to/from an external resource. External devices/resources may comprise any known type of external device, including a monitor/display, speakers, storage, another computer system, a hand-held device, keyboard, mouse, voice recognition system, speech output system, printer, facsimile, pager, etc. Bus provides a communication link between each of the components in the computing system and likewise may comprise any known type of transmission link, including electrical, optical, wireless, etc. Additional components, such as cache memory, communication systems, system software, etc., may be incorporated into the computing system.

Access to real time event data processing system 10 may be provided over a network such as the Internet, a local area network (LAN), a wide area network (WAN), a virtual private network (VPN), etc. Communication could occur via a direct hardwired connection (e.g., serial port), or via an addressable connection that may utilize any combination of wireline and/or wireless transmission methods. Moreover, conventional network connectivity, such as Token Ring, Ethernet, WiFi or other conventional communications standards could be used. Still yet, connectivity could be provided by conventional TCP/IP sockets-based protocol. In this instance, an Internet service provider could be used to establish interconnectivity. Further, as indicated above, communication could occur in a client-server or server-server environment.

It should be appreciated that the teachings of the present invention could be offered as a business method on a subscription or fee basis. For example, a computer system comprising a real time data event processing system 10 could be created, maintained and/or deployed by a service provider that offers the functions described herein for customers. That is, a service provider could offer to provide event processing as described above.

It is understood that the systems, functions, mechanisms, methods, engines and modules described herein can be implemented in hardware, software, or a combination of hardware and software. They may be implemented by any type of computer system or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. In a further embodiment, part or all of the invention could be implemented in a distributed manner, e.g., over a network such as the Internet.

The present invention can also be embedded in a computer program product, which comprises all the features enabling the implementation of the methods and functions described herein, and which—when loaded in a computer system—is able to carry out these methods and functions. Terms such as computer program, software program, program, program product, software, etc., in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

The invention claimed is:

1. A system, comprising:
   at least one computing device for processing a stream of data events by performing a method comprising:
   providing a running statistical summary of the stream of data events, wherein the hybrid histogram includes a plurality of percentile ranges, a set of boundary values that separate the percentile ranges, and a count associated with each of the percentile ranges;
   identifying a percentile range from the plurality of percentile ranges into which a new data event value falls, and for incrementing the count associated with the identified percentile range;
   periodically recalculating the boundary values such that each percentile range includes a substantially similar number of associated counts; and
   analyzing the hybrid histogram.

2. The system of claim 1, wherein the identifying includes a binary tree algorithm.

3. The system of claim 1, wherein the recalculating includes recalculating the boundary values periodically after a predefined plurality of data event values is processed.

4. The system of claim 1, wherein the recalculating includes recalculating the boundary values using a data-driven analysis in which a new boundary is calculated when a number of counts for a bucket exceed a balanced size by more than a predetermined amount.

5. The system of claim 1, wherein the relcalculating includes determining a new boundary B for a q'th bucket as:

$$B[q]=B[q]+K*(N*PR[q]-CC)$$

where K is an adjustment constant, CC is a cumulative count of events counted in the buckets below the boundary B, and PR[q] is a percentile range boundary for the q'th bucket.

6. The system of claim 1, wherein the relcalculating includes determining a new boundary B for the q'th boundary as:

$$B[q]=B[q]+K2*(PR[q]-CC/N)$$

where K2 is an adjustment constant, CC is a cumulative count of events counted in the buckets below the boundary B, and PR[q] is a percentile range boundary for the q'th bucket.

7. The system of claim 4, wherein the relcalculating includes determining a new boundary B for the q'th boundary as:

$$B[q]=B[q]+K3[q]*(PR[q]-CC/N),$$

where CC is a cumulative count of events counted in the buckets below the boundary B and:

$$K3[q]=K2*(B[r]-B[l])/(PR[r]-PR[l])$$

where B[r] is a boundary value immediately to the left of B, B[l] is a boundary value immediately to the right of B, PR[r] is a percentile range boundary immediately to the right of B and PR[l] is a percentile range boundary immediately to the left of B.

8. The system of claim 1, the method further comprising defining a number of percentile ranges in the hybrid histogram and defining initial values for the boundary values.

9. The system of claim 1, wherein the stream of data events come from a source selected from the group consisting of: a financial institution, a network, a device, a computer program, a business, and an enterprise.

10. The system of claim 1, wherein the analyzing includes selecting a process from the group consisting of: identifying potentially fraudulent activities, identifying trends and patterns, identifying risks, identifying problems, and identifying business opportunities.

11. A computer program product stored on a computer readable storage medium, which when executed, processes a stream of data events, the program product comprising:
   computer program code configured for updating a hybrid histogram data object that stores a running statistical summary of the stream of data events, wherein the hybrid histogram data object includes a plurality of percentile ranges, a set of boundary values that separate the percentile ranges, and a count associated with each of the percentile ranges;

computer program code configured for identifying a percentile range from the plurality of percentile ranges into which a new data event value falls, and for incrementing the count associated with the identified percentile range;

computer program code configured for periodically recalculating the boundary values such that each percentile range includes a substantially similar number of associated counts; and computer program code configured for analyzing the hybrid histogram data object.

12. The program product of claim 11, wherein the computer program code configured for identifying a percentile range includes a binary tree algorithm.

13. The program product of claim 11, wherein the computer program code configured for periodically recalculating the boundary values periodically recalculates the boundary values after a predefined plurality of data event values is processed.

14. The program product of claim 11, wherein the computer program code configured for periodically recalculating the boundary values recalculates the boundary values using a data-driven analysis in which a new boundary is calculated when a number of counts for a bucket exceed a balanced size by more than a predetermined amount.

15. The program product of claim 11, wherein the computer program code configured for periodically recalculating the boundary values determines a new boundary B for the q'th boundary as:

$$B[q]=B[q]+K*(N*PR[q]-CC)$$

where K is an adjustment constant, CC is a cumulative count of events counted in the buckets below the boundary B, and PR is a percentile range.

16. The program product of claim 11, wherein the computer program code configured for periodically recalculating the boundary values determines a new boundary B for the q'th boundary as:

$$B[q]=B[q]+K2*(PR[q]-CC/N)$$

where K2 is an adjustment constant, CC is a cumulative count of events counted in the buckets below the boundary B, and PR is a percentile range.

17. The program product of claim 11, wherein the computer program code configured for periodically recalculating the boundary values determines a new boundary B for the q'th boundary as:

$$B[q]=B[q]+K3[q]*(PR[q]-CC/N),$$

where CC is a cumulative count of events counted in the buckets below the boundary B, PR[q] is a percentile range for the qth bucket and:

$$K3[q]=K2*(B[r]-[l])/(PR[r]-PR[l])$$

where B[r] is a boundary value immediately to the left of B, B[l] is a boundary value immediately to the right of B, PR[r] is a percentile range immediately to the right of B and PR[l] is a percentile range immediately to the left of B.

18. The program product of claim 11, further comprising computer program code configured for defining a number of percentile ranges in the hybrid histogram data object and for defining initial values for the boundary values.

19. The program product of claim 11, wherein the stream of data events come from a source selected from the group consisting of: a financial institution, a network, a device, a computer program, a business, and an enterprise.

20. The program product of claim 11, wherein the computer program code configured for analyzing the hybrid histogram data object includes a process selected from the group consisting of: identifying potentially fraudulent activities, identifying trends and patterns, identifying risks, identifying problems, and identifying business opportunities.

21. A method of processing a stream of data events, comprising:

providing, on at least one computing device, a hybrid histogram that stores a running statistical summary of the stream of data events, wherein the hybrid histogram includes a plurality of percentile ranges, a set of boundary values that separate the percentile ranges, and a count associated with each of the percentile ranges;

obtaining, on the at least one computing device, a new data event value;

identifying, on the at least one computing device, a percentile range from the plurality of percentile ranges into which the new data event value falls;

incrementing, on the at least one computing device, the count associated with the identified percentile range;

periodically recalculating, on the at least one computing device, the boundary values such that each percentile range includes a substantially similar number of associated counts; and analyzing, on the at least one computing device, the hybrid histogram.

22. The method of claim 21, wherein identifying the percentile range includes using a binary tree algorithm.

23. The method of claim 21, wherein periodically recalculating occurs after a predefined plurality of data event values is processed.

24. The method of claim 21, wherein recalculating occurs when a number of counts for a bucket exceeds a balanced size.

25. The method of claim 21, further comprising defining, on the at least one computing device, a number of periodic ranges in the hybrid histogram and defining, on the at least one computing device, initial values for the boundary values.

26. The method of claim 21, wherein analyzing the hybrid histogram includes selecting a process from the group consisting of: identifying potentially fraudulent activities, identifying trends and patterns, identifying risks, identifying problems, and identifying business opportunities.

* * * * *